United States Patent [19]
Keeler et al.

[11] Patent Number: 5,810,377
[45] Date of Patent: *Sep. 22, 1998

[54] FABRICATED STEER AXLE

[75] Inventors: Michael J. Keeler, Black Lick; Michael J. Gottschalk, Grandville, both of Ohio

[73] Assignee: The Boler Company, Itasca, Ill.

[*] Notice: This patent issued on a continued prosecution application filed under 37 CFR 1.53(d), and is subject to the twenty year patent term provisions of 35 U.S.C. 154(a)(2).

[21] Appl. No.: 784,543

[22] Filed: Jan. 21, 1997

[51] Int. Cl.[6] .................................................. B60G 17/00
[52] U.S. Cl. ......................... 280/96.1; 180/905; 280/673
[58] Field of Search ........................... 280/96.1, 93, 272, 280/711, 788, 688, 673; 180/905

[56] References Cited

U.S. PATENT DOCUMENTS

| | | | |
|---|---|---|---|
| 1,196,436 | 8/1916 | Dorn | 301/127 |
| 1,200,305 | 10/1916 | Brush | 280/96.1 |
| 1,784,856 | 12/1930 | Urschel | 301/124.1 |
| 1,841,735 | 1/1932 | Hufferd et al. | |
| 1,899,347 | 2/1933 | Mogford et al. | 301/124.1 |
| 2,007,793 | 7/1935 | Crawford | 301/124.1 |
| 2,044,389 | 6/1936 | Kay | |
| 2,148,714 | 2/1939 | Urschel | 301/124.1 |
| 2,218,127 | 10/1940 | Urschel | |
| 2,411,836 | 11/1946 | Seckel | |
| 2,685,479 | 8/1954 | Buckendale | 301/124.1 |
| 2,911,262 | 11/1959 | Franck | 280/96.3 |
| 3,072,441 | 1/1963 | Schilberg | 301/124.1 |
| 3,342,507 | 9/1967 | Koch et al. | 280/96.1 |
| 3,804,467 | 4/1974 | Austermann | 301/127 |
| 4,192,396 | 3/1980 | Austermann, Jr. et al. | 280/663 |
| 4,203,617 | 5/1980 | Bowman, Jr. | 280/797 |
| 4,361,360 | 11/1982 | Kuether | 428/613 |
| 4,566,719 | 1/1986 | Van Denberg | 280/711 |
| 4,762,337 | 8/1988 | Raidel | 280/711 |
| 4,763,923 | 8/1988 | Raidel | 280/704 |
| 4,768,808 | 9/1988 | DeRees | 180/905 |
| 4,802,690 | 2/1989 | Raidel | 280/713 |
| 4,813,507 | 3/1989 | Tanaka et al. | 280/80.1 |
| 4,915,530 | 4/1990 | Tomlinson | 280/96.1 |
| 4,938,494 | 7/1990 | Takahashi et al. | 280/96.1 |
| 4,951,962 | 8/1990 | Tomida et al. | |
| 5,037,126 | 8/1991 | Gottschalk et al. | 280/688 |
| 5,269,593 | 12/1993 | Wasson | |
| 5,303,985 | 4/1994 | Barnholt et al. | |
| 5,324,073 | 6/1994 | Alatalo et al. | |
| 5,403,031 | 4/1995 | Gottschalk et al. | 280/661 |
| 5,429,423 | 7/1995 | Pollock et al. | 301/124.1 |
| 5,683,098 | 11/1997 | VanDenberg | 280/711 |

*Primary Examiner*—Charles Jordan
*Assistant Examiner*—Theresa M. Wesson
*Attorney, Agent, or Firm*—Hall, Priddy & Myers

[57] ABSTRACT

A fabricated high strength non-driven steer axle is provided so as to be cost effective to manufacture, the axle having a limited number of parts and steps of manufacture, as well as being of a reduced weight. The axle includes an integral one piece metallic form having a substantially U-shaped central portion in cross-section, and a pair of spaced arms extending from each end thereof toward a respective king pin mounting area. In order to simplify king pin mounting (e.g. eliminate the need for a bearing sleeve or tube), a separate king pin reinforcing plate is inserted between the spaced arms so that each king pin is received through an orifice in the reinforcing plate and a corresponding orifice defined in another plate, both in a bearing manner so as to efficiently support the king pin.

34 Claims, 13 Drawing Sheets

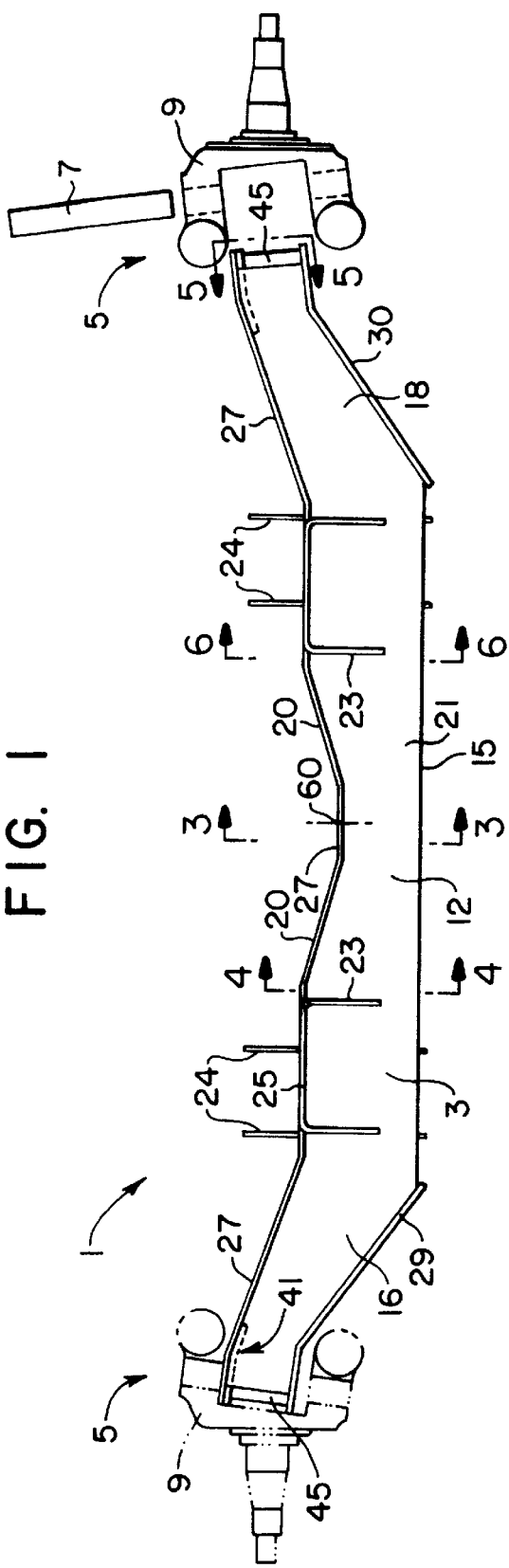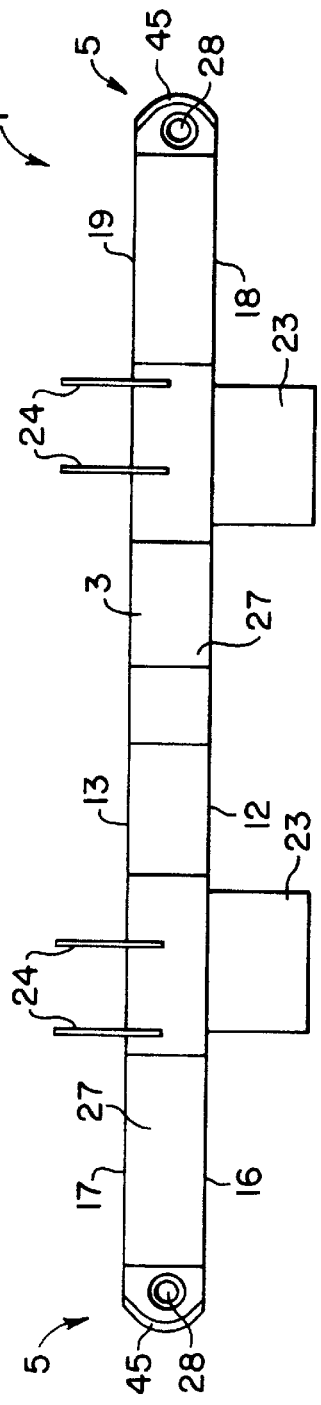

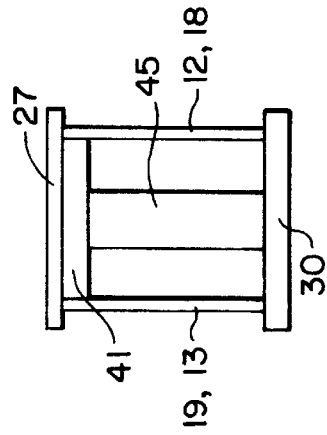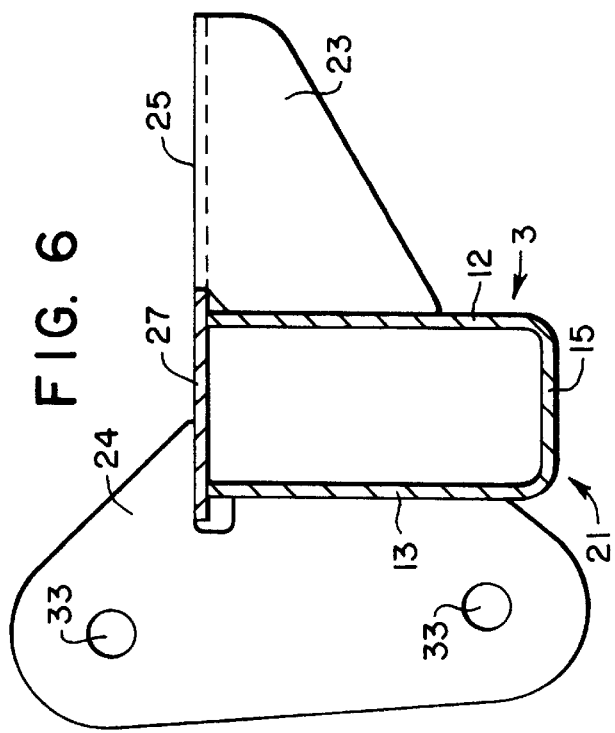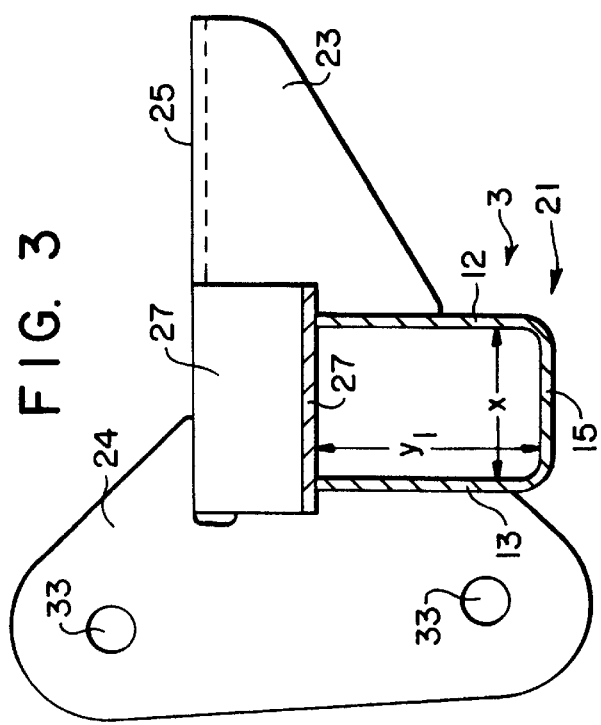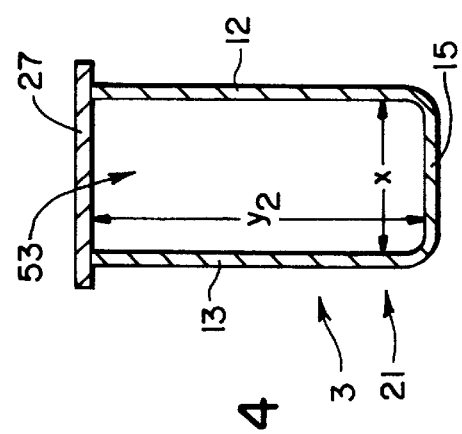

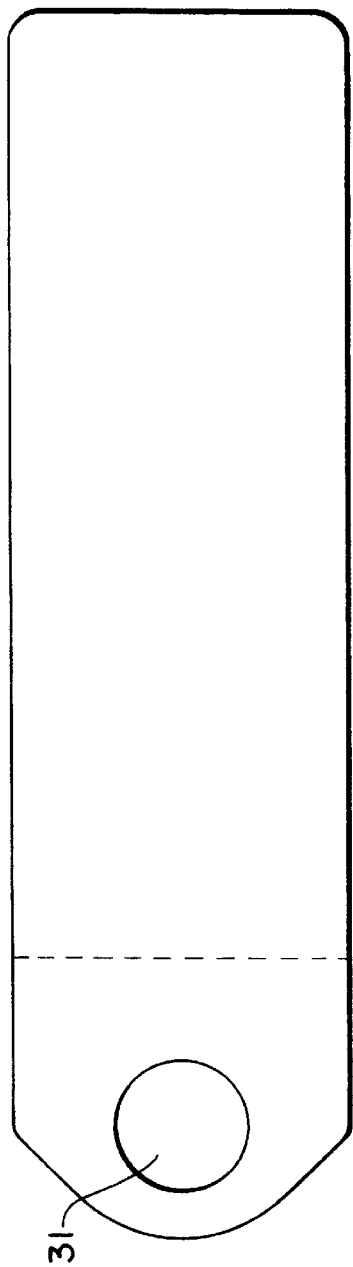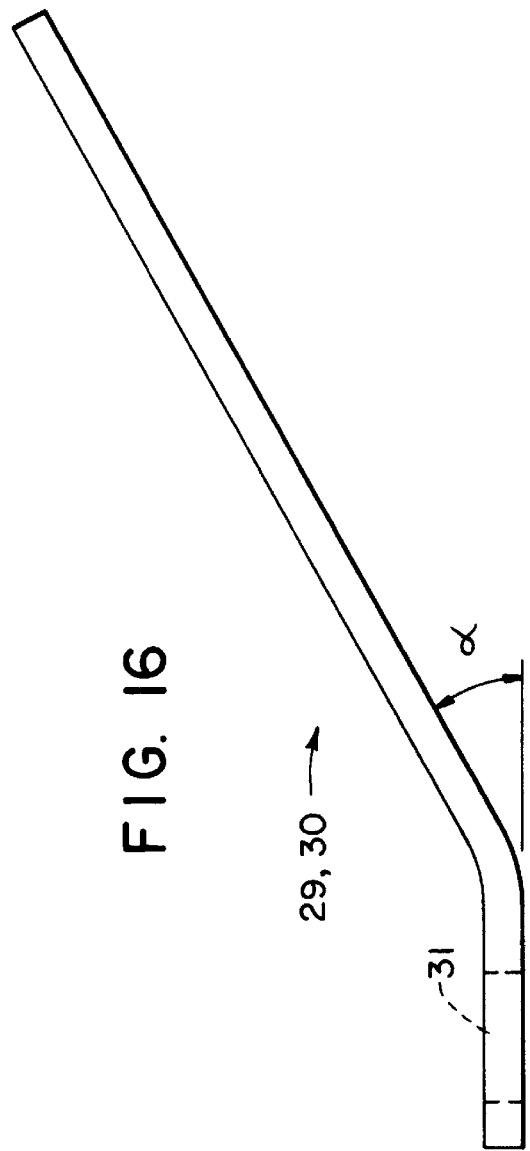

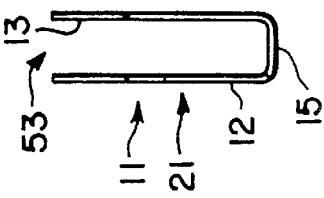
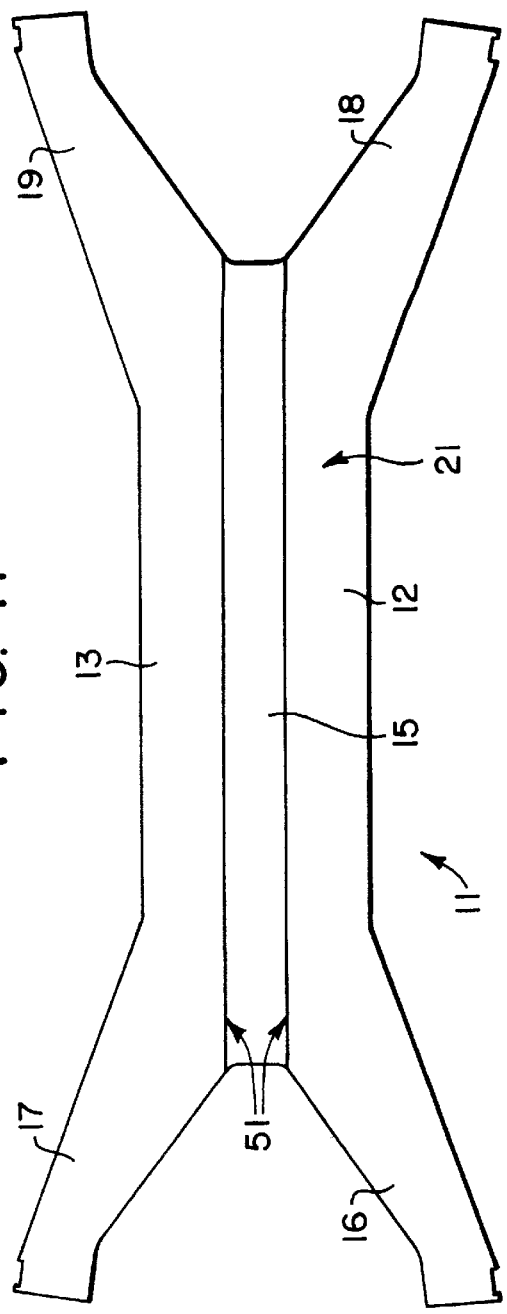
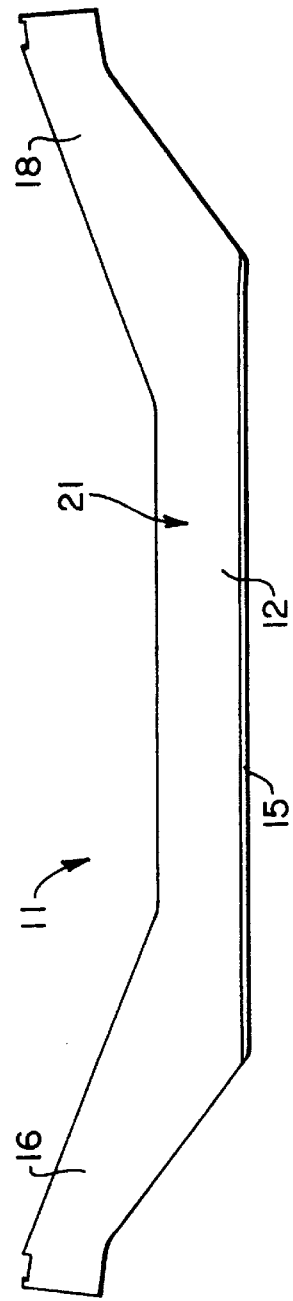

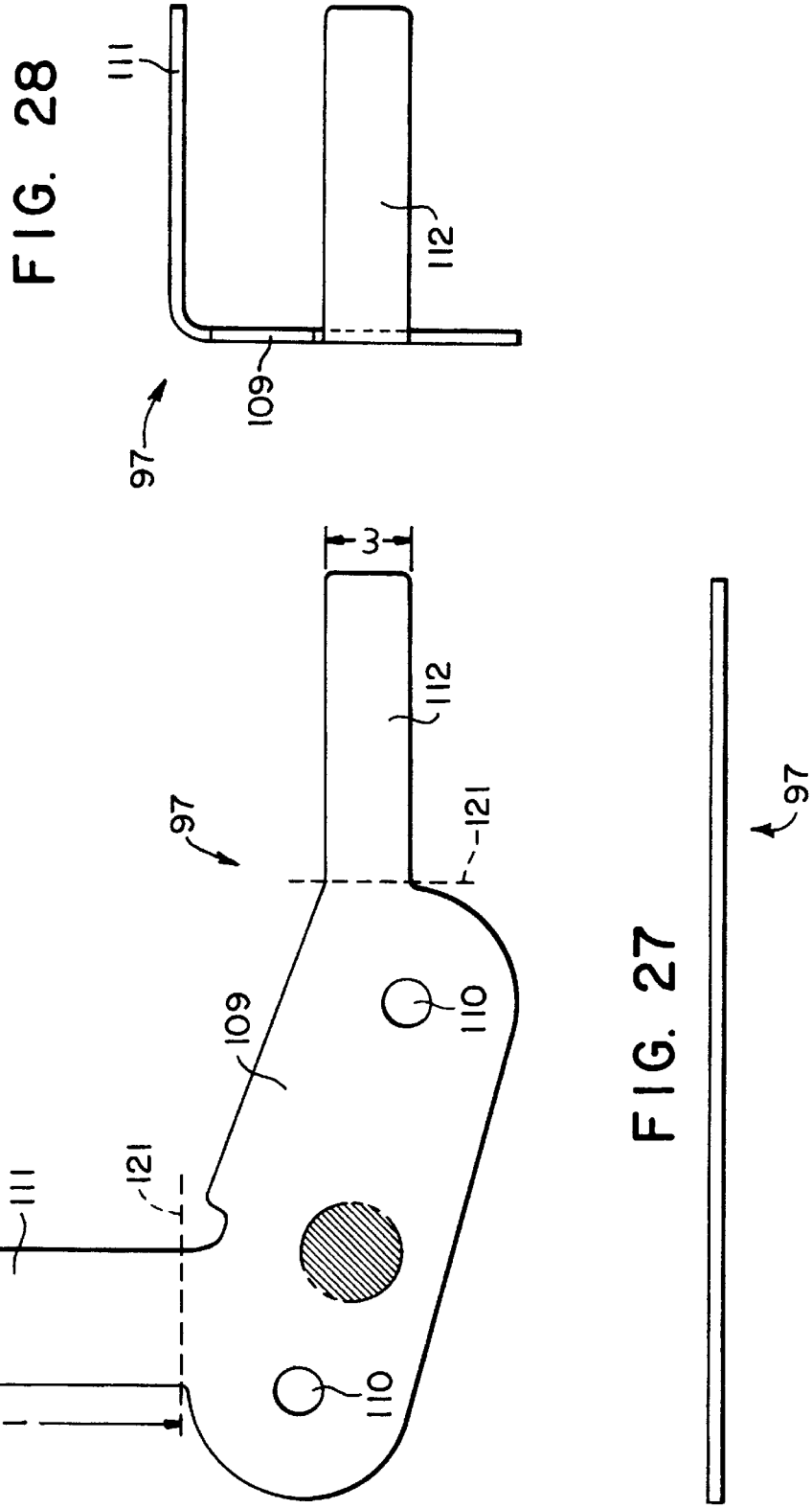

FABRICATED STEER AXLE

This application relates to a fabricated axle for wheeled vehicles. More specifically, this application relates to a fabricated high strength non-driven axle for wheeled vehicles.

BACKGROUND OF THE INVENTION

Typical steer axle assemblies include a forged I-beam axle, and a pair of steering knuckles pivotally attached to the I-beam by way of king pins. An example of a forged non-driven steer axle is disclosed in U.S. Pat. No. 5,403,031. While such forged axles provide for excellent strength, durability, and a high degree of king pin mounting accuracy, they are, however, not cost effective due to their weight and method of manufacture.

Tubular fabricated non-driven steer axles are also known in the art. For example, in U.S. Pat. No. 5,429,423 there is disclosed a tubular axle manufactured by mating opposing axle sections constructed of sheet material formed into channel members. The channel members are of different lengths and connected to one another via vertical and horizontal welds. However, the fabricated axle disclosed in the '423 patent includes "in-tension" welding along the bottom of the axle in the high stress region between the air spring mounts. This is undesirable in view of the known axle loading requirements present in the trucking and automobile industries. Furthermore, the king pin mounting structures at either end of the fabricated axle of this patent utilize heavy and expensive forging which must be machined. This sleeve-like forging is undesirable in that it is both heavy and expensive to manufacture. An additional problem associated with the axle assembly of this patent is the large number of parts and steps involved in its manufacture.

U.S. Pat. No. 1,784,856 discloses an axle formed of steel tubing for wheeled vehicles. As the holes at either end of the axle are insufficient in and of themselves to provide adequate mounting for the knuckles, a cylindrical bearing tube or sleeve is provided at each axle end within the holes for receiving the mounting pins. These tubes add to the weight of the axle assembly, and represent a drawback given current weight limitations placed upon the trucking industry. Furthermore, given tolerance requirements and the number of parts utilized, the method of manufacturing such an axle has drawbacks of its own, including those of cost and material.

It is apparent from the above that there exists a need in the art for an improved non-driven non-forged steer axle that may be manufactured in a cost effective manner using a minimum number of parts and steps, the axle having a reduced weight relative to current axle designs. It is apparent that there also exists a further need for a high strength axle which substantially eliminates the necessity for in-tension welding in high stress areas, and provides a means for enabling king pin mounting accuracy in a cost effective manner.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing an axle for a wheeled vehicle, comprising:

an integral one piece metallic form including a substantially U-shaped central portion and a pair of spaced arms extending from each end of said U-shaped central portion, the U-shaped central portion having an open portion and a closed portion; and a plate member located over and abridging the open portion of the U-shaped central portion such that the closed portion of the U-shaped central portion is in tension during operation of the wheeled vehicle.

According to certain preferred embodiments of this invention, the axle further includes a floating reinforcing plate extending between each pair of spaced arms in respective king pin mounting structures, each of the floating reinforcing plates having an orifice defined therein for retaining a king pin and being of sufficient strength to provide a bearing for the king pin.

This invention further fulfills the above-described needs in the art by providing an axle assembly for a wheeled vehicle, the axle assembly comprising:

first and second opposing sidewalls each extending to a king pin mounting structure and defining a cavity therebetween;

a king pin mounting plate having a king pin receiving orifice defined therein, the king pin mounting plate abridging the first and second sidewalls at one side thereof and the receiving orifice being of a size so as to receive the king pin in a bearing manner in order to support the king pin against lateral movement;

a cover plate having a guide hole defined therein through which the king pin is adapted to be fed, the cover plate abridging the first and second sidewalls at the other side thereof opposite the king pin mounting plate; and a reinforcing plate having a king pin receiving orifice defined therein for receiving the king pin in a bearing manner so as to support the king pin against lateral movement, the reinforcing plate inserted and located in the cavity between the first and second sidewalls adjacent the cover plate.

This invention further provides a non-driven axle comprising: an elongated portion extending between first and second king pin mounting means; and one of said king pin mounting means including first, second, and third plates having defined therein first, second, and third orfices, respectively, for receiving a king pin.

According to certain embodiments of this invention, a method of manufacturing the axle or axle assembly defined above is provided.

According to still further embodiments, the axle assembly defined above may be used in conjunction with a lift axle suspension system for a truck or the like.

This invention will now be described with respect to certain embodiments thereof as illustrated in the following drawings:

BRIEF DESCRIPTION OF THE DRAWINGS

FIG. 1 is a front elevational view of a steer axle assembly according to an embodiment of this invention.

FIG. 2 is a top elevational view of the steer axle assembly illustrated in FIG. 1.

FIG. 3 is a transverse cross-sectional view of the steer axle assembly of FIG. 1, taken along line 3—3.

FIG. 4 is a transverse cross-sectional view of the fabricated steer axle of FIG. 1, taken along line 4—4.

FIG. 5 is a transverse elevational view of the fabricated steer axle of FIG. 1, taken along line 5—5.

FIG. 6 is a transverse cross-sectional view of the steer axle assembly of FIG. 1, taken along line 6—6.

FIG. 15 is a top elevation view of one of the king pin mounting plates shown in FIGS. 1, 7, and 8.

FIG. 16 is a side elevation view of the FIG. 15 king pin mounting plate.

FIG. 17 is a top elevation view of the integral one piece metallic form of FIGS. 1–8, prior to its shaping into the U-shaped member.

FIG. 18 is a front elevation view of the FIG. 17 integral form, after shaping into the U-shaped member with arms extending therefrom.

FIG. 19 is a transverse elevation view of the FIG. 18 form.

FIG. 26 is a top plan view of the other half of the combined air spring/suspension mount for attachment to the FIG. 23–25 member, prior to forming.

FIG. 27 is a side view of the FIG. 26 form, prior to forming.

FIG. 28 is a front plan view of the FIG. 26–27 member, after bending/forming.

DETAILED DESCRIPTION OF CERTAIN EMBODIMENTS OF THIS INVENTION

Figure 8:
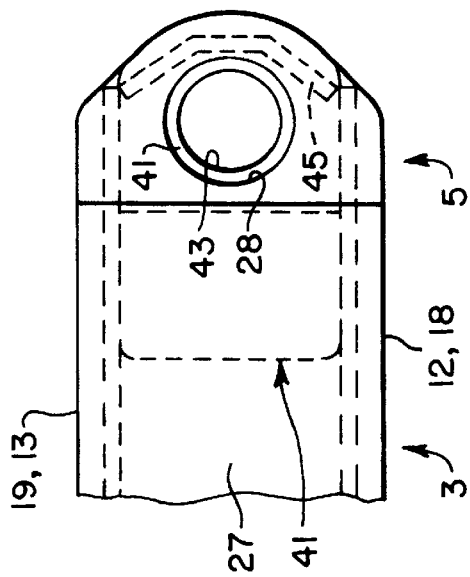
FIG. 8 is a top elevation view of the king pin mounting structure of the axle shown in FIGS. 1 and 7.

With reference first to FIG. 1 there is illustrated a steer axle assembly 1 according to this invention. Steer axle assembly 1 includes tubular elongated non-driven fabricated axle 3 having a king pin mounting structure 5 at each end thereof for the purpose of accurately mounting and supporting king pins 7 and steering knuckles 9. Due to its design fully discussed below, no welds are required at areas of the axle that are in tension during normal operation of the vehicle, and axle 3 is approximately half the weight of a conventional forged I-beam axle.

Referring now with more particularlity to FIGS. 1–6 and 17–19, axle 3 includes integral one piece metallic form 11 (see FIGS. 17–19) that itself includes vertically oriented sidewalls 12 and 13, bottom portion 15 that connects the sidewalls in the central substantially U-shaped area, and elongated arms 16–19 extending outwardly from central U-shaped portion 21 toward king pin mounting structures 5. Spaced apart arms 16 and 17 extend from one end of central U-shaped portion 21 toward one king pin mounting structure 5 while spaced arms 18 and 19 extend from the other end of U-shaped portion 21 toward the opposite king pin mounting structure 5. As will be discussed below, during fabrication, all welding on axle 3, in areas of high stress, is on the compression side of the axle as opposed to the tension side. For most vehicles using the axles of this invention, when in use, the top side of the axle is the side in compression while the opposite, bottom side is in tension.

Referring to FIGS. 1–3, air spring mounting members 23, including support surfaces 25, and suspension mounts 24 are attached (e.g. welded) to integrally formed U-shaped central portion 21 in this high stress area of the axle (i.e. the central portion of axle 3 between air spring mounting members 23 is the most susceptible to stress during certain vehicle operations). Bottom portion 15 of U-shaped portion 21 extends longitudinally (of the axle) beyond air spring mounting members 23, and suspension mounts 24, in order to provide axle strength in this high stress area between the air springs. Axle 3 has an increased vertical cross-section in the air spring mounting areas relative to that at the center of the axle and the king pin mounting structures 5 due to the strength requirements associated with this section of the axle. This is accomplished by the provision of ramp portions which extend from either end of the central section of the axle. There are no welds "in tension" utilized at this section of the axle.

Top cover plate member 27 is affixed across the top of the open end 53 of U-shaped portion 21 so that the closed end of U-shaped portion 21 is in tension during operation of the wheeled vehicle to which axle assembly 1 is mounted. Top plate 27 connects the upper ends of opposing sidewalls 12 and 13 along the entire length of axle 3, so that plate 27 extends between and connects the opposing king pin mounting structures 5. Top plate 27 includes a pair of guide apertures or holes 28 defined therein, one such hole 28 being located at each end of plate 27 for the purpose of loosely receiving (i.e. in a non-bearing manner) a corresponding cylindrical king pin 7. Because arms 16–19 are part of sidewalls 12–13, top plate 27 also connects the upper edges or sides thereof.

King pin mounting plates 29 and 30 also form part of axle 3, plate 29 being mounted to the bottom of form 11 so as to connect the bottom edges of arms 16 and 17. King pin mounting plate 30 is also mounted to the bottom of form 11, but at the other end of the axle so as to connect the bottom edges of arms 18 and 19. Each king pin mounting plate 29, 30 includes a king pin receiving orifice 31 (see FIGS. 7, 15, and 16) defined therein for the purpose of tightly receiving a corresponding king pin 7 in a bearing manner so as to rigidly support the pin 7 against lateral and tilting movement.

FIG. 3 is a cross sectional view of axle assembly 1 taken along line 3—3 in FIG. 1. As shown, top plate 27 closes the open end 53 of U-shaped portion 21 at the center of the axle. Air spring supporting member 23 and vehicle suspension mount 24 are affixed to opposite sides of U-shaped portion 21. FIG. 4 further illustrates the U-shaped cross section of central portion 21 of axle 3, while FIG. 6 illustrates the axle's cross section along line 6—6 in FIG. 1. Apertures 33 are provided in the sidewalls of suspension mounts 24 so that mounts 24 can be mounted to the vehicle suspension or the like.

According to certain embodiments of this invention, an improved king pin-to-axle mounting assembly is provided. As discussed above, each king pin 7 extends through both a guide aperture 28 in top plate 27 and a bearing orifice 31 in a corresponding king pin mounting plate 29, 30 during vehicle operation. King pins 7 typically have a substantially constant diameter throughout their length. Thus, because the diameter of guide apertures 28 is substantially greater than the diameter of bearing orifices 31, the king pins are tightly received in orifices 31 and loosely in guide apertures 28. Therefore, apertures 28 and 31, in plates 27 and 29, 30 respectively, can be machined in their respective metallic plates before the axle assembly is welded together because precise tolerances are not required. While the accuracy of king pin mounting is critical in all directions, the tolerance requirements for apertures 28 and 31 are fairly loose in this design, because king pins 7 can fit through both apertures 28 and 31 even when they are slightly offset from one another, due to the larger size of aperture 28 relative to aperture 31. Accordingly, axle assembly 1 is easier and more cost effective to manufacture and assemble.

Figure 7:
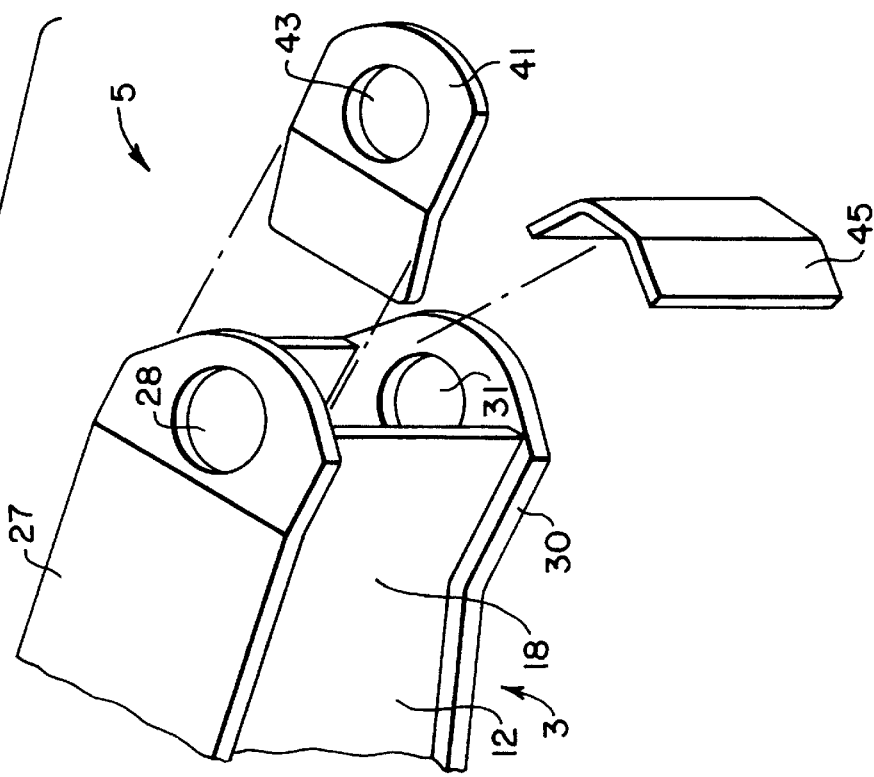
FIG. 7 is an exploded perspective view of one of the king pin mounting structures of the axle of FIG. 1.

Referring to FIGS. 5 and 7–8, a king pin reinforcing plate 41 is adapted to be inserted into the gap or cavity defined between sidewalls 12 and 13, at each end of the axle, adjacent plate 27 in order to provide a secure mounting of king pin 7. Reinforcing plate 41 includes king pin receiving orifice 43 defined therein for the purpose of tightly receiving king pin 7 in a bearing manner in order to provide rigid support for same against movement. When the king pin has a substantially constant diameter throughout its length, the diameter of orifice 43 is substantially the same size as the diameter of orifice 31, with both orifices 31 and 43 receiving the king pin in a supportive bearing manner. In certain embodiments, the king pin is forcibly pressed through orifices 31 and 43 as the diameter of the king pin is substantially the same as that of orifices 31 and 43. After insertion, the king pin bears tightly against the inner diametric surfaces of orifices 31 and 43 so that the pin 7 is rigidly retained or secured during vehicle operation. Accordingly, plates 41 and 29, 30 provide the sole bearing surfaces for king pins 7, so that no bearing sleeves or tubes are required. Also, typical keyways on king pins 7 may be eliminated.

Referring still to FIGS. 5 and 7–8, reinforcing plate or washer 41 is a floating member as it is not integrally formed with either top plate 27 or the axle sidewalls or arms. Thus, after plates 27 and 30 are welded to sidewalls 12, 13 (and arms), reinforcing plate 41, with orifice 43 therein, is inserted into the gap between the sidewalls until orifice 43 lines up with orifice 31 within a predetermined tolerance. The floating nature of plate 41 allows it to be adjusted, after its insertion between the sidewalls, so that proper tolerances may be achieved prior to the welding of plate 41 to the axle. Thereafter, the king pins are pressed through apertures 43 and 31 so as to be rigidly mounted in axle 3. As plate 41 becomes a king pin bearing surface, plate 27 may be made of a lesser material to keep costs and weight down. Another advantage associated with this design is that orifices 28, 31, and 43 may be machined prior to axle fabrication.

Still referring to FIGS. 7–8, optionally, after floating reinforcing plate 41 is inserted into the hollow aperture of axle 3, the corresponding end of the axle may be covered or closed by welding end plate 45 thereto so as to enclose the inner cavity. End plate 45 also functions to support plate 41 within the axle in a fixed position. As illustrated, each end plate 45 has three separate major planar surfaces in order to conform with the rounded ends of axle 3 at king pin mounting structures 5.

Figure 9:
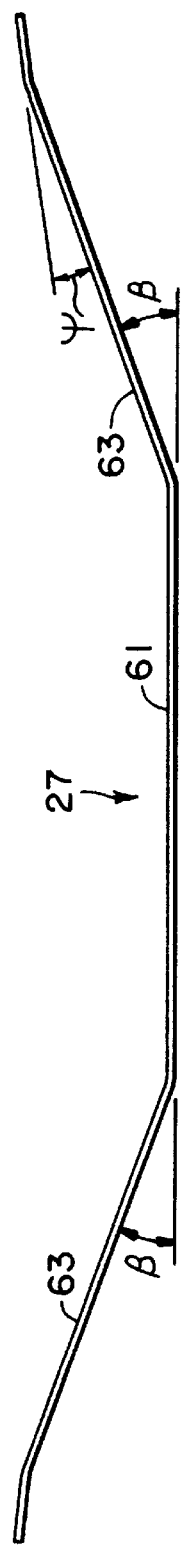
FIG. 9 is a front elevation view of one of the elongated cover plate members of FIGS. 1–8 for connecting the tops of the axle sidewalls.
Figure 10:
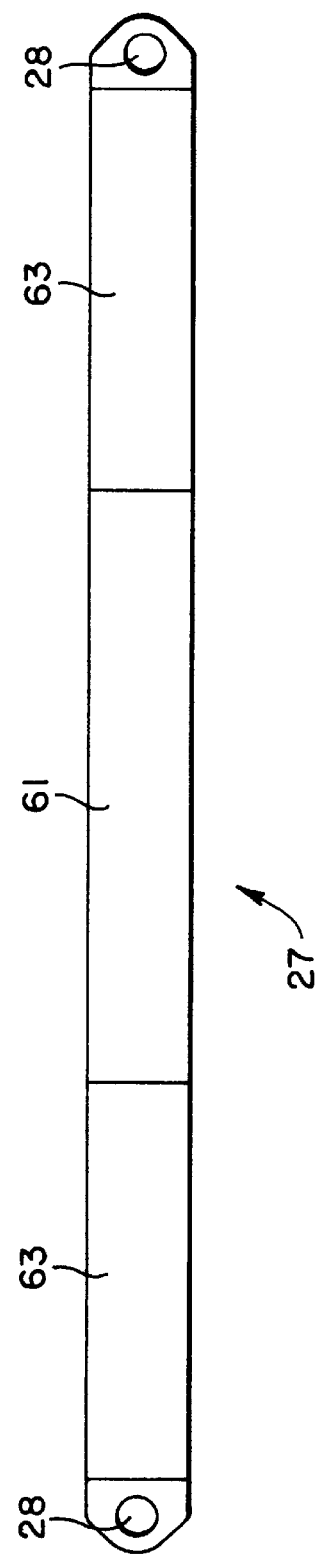
FIG. 10 is a top elevation view of the elongated cover plate member of FIG. 9.

FIGS. 9 and 10 are front and top elevational views of top plate 27, including guide holes 28 defined in either end thereof. As can be seen, top plate 27 is contoured to fit the tops of sidewalls 12 and 13 throughout the entire length of axle 3. Plate 27 may be about 0.250 inches thick in certain embodiments, while the radius of guide holes 28 may be about 1.0 inch. Angle $\beta$ illustrated in FIG. 9, defined between central portion 61 of plate 27 and extensions 63, may be from about 10°–30° in certain embodiments, preferably about 19.5°. Meanwhile, angle $\Psi$ may be from about 5°–20°, preferably about 13°.

Figure 12:
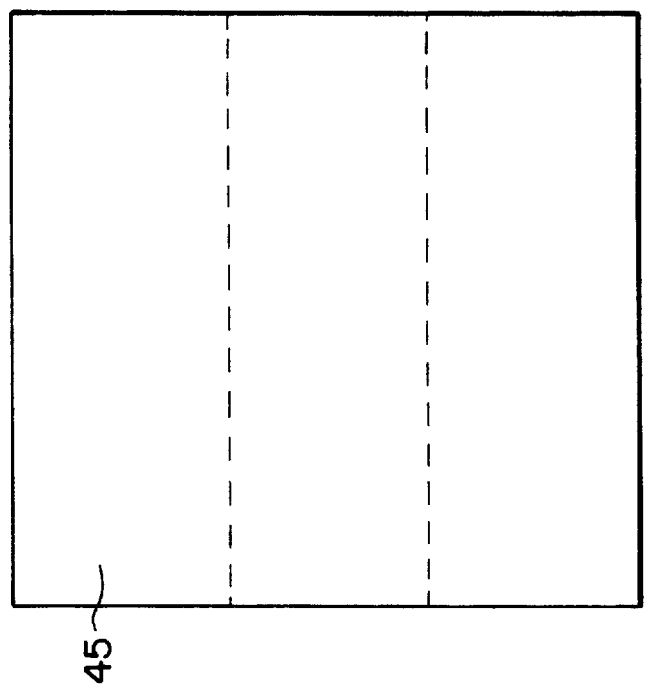
FIG. 12 is a transverse elevational view of the FIG. 11 end plate.
Figure 11:
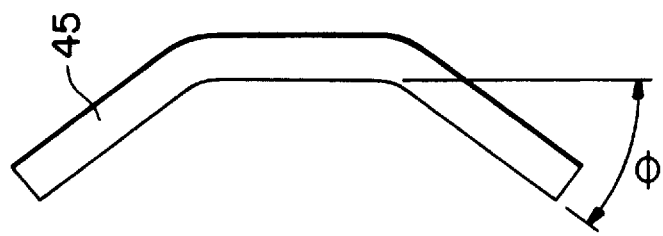
FIG. 11 is a top elevational view of one of the axle end plates shown in FIGS. 2, 7, and 8.

FIGS. 11 and 12 are top and transverse elevational views, respectively, of an end plate 45. In certain embodiments, plate 45 is approximately 0.250 inches thick, and angle $\theta$ may be from about 30°–50°, preferably about 38°.

Figure 14:
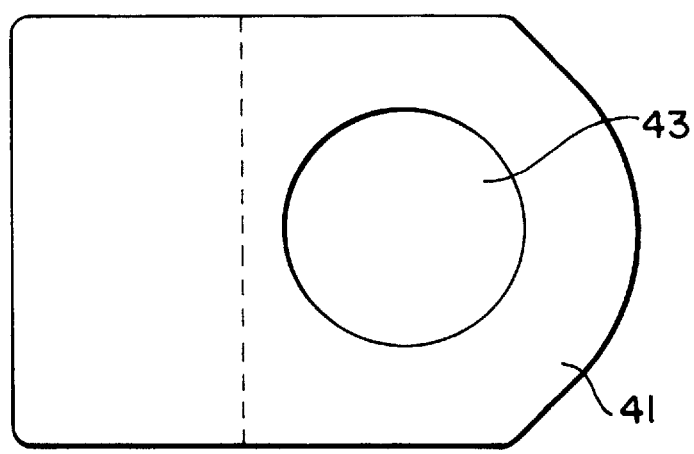
FIG. 14 is a top elevation view of the FIG. 13 floating reinforcing plate.
Figure 13:
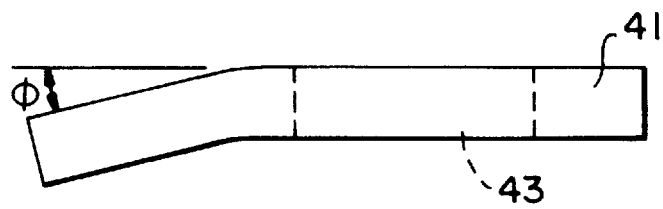
FIG. 13 is a side elevation view of one of the floating reinforcing plates, of FIGS. 1, 7, and 8, that receives the king pin in a bearing manner.

FIGS. 13 and 14 are front and top elevational views of floating reinforcing plate 41 that is adapted to be inserted into the interior of axle 3 within the king pin mounting structures in order to provide additional support for the corresponding king pins 7. According to certain embodiments, angle $\phi$ may be from about 4°–25°, preferably about 12.96°, so that the contour of plate 41 conforms with that of top plate 27. Furthermore, plate 41 may be about 0.500 inches thick in certain embodiments (substantially thicker than plate 27). The bore of orifice 43 may be from about 1.806–1.808 inches in certain embodiments, while the overall length of plate 41 may be about 4.498 inches.

FIGS. 15 and 16 are top and front elevational views, respectively, of king pin mounting plate 29, 30 adapted to be welded to the bottom edges of the arms in order to connect same. In certain embodiments, each metallic plate 29, 30 may be about 0.500 inches thick, and angle $\alpha$ may be about 28.5°. Thus, plates 29, 30, and 41 are all substantially the same thickness according to certain embodiments, with each of these being thicker than plate 27 in order to provide the strength required for handling the king pin bearing loads. Furthermore, plates 29 and 30 may each be about 17.433 inches long in certain embodiments of this invention (measured flat). The inner diametric surfaces of orifices 31 and 43 are king pin bearing surfaces.

FIG. 17 is a top elevational view of integral one piece metallic form 11, as it lays flat prior to bending. From this shape, the sides of form 11 are bent approximately 90° about lines 51 in order to form U-shaped central portion 21 and arms 16–19 extending from the ends thereof. FIG. 18 is a front elevational view of form 11 after it has been shaped by bending. In FIG. 18, after bending, form 11 includes central U-shaped portion 21 and the spaced arms extending therefrom at each end.

FIG. 19 is a cross sectional view of the FIG. 18 form 11 taken in the central portion 21 so as to illustrate bottom portion 15 of the one piece member connecting sidewalls 12 and 13 at the closed end of the U-shaped member.

While portion 21 is illustrated as almost perfectly U-shaped, this need not be the case, as variations thereof will suffice. For example, the closed end of the U-shaped design need not be rounded, and the walls of portion 21 need not be perfectly parallel. In other words, clearly, variations of the illustrated U-shaped design are envisioned herein.

Figure 20:
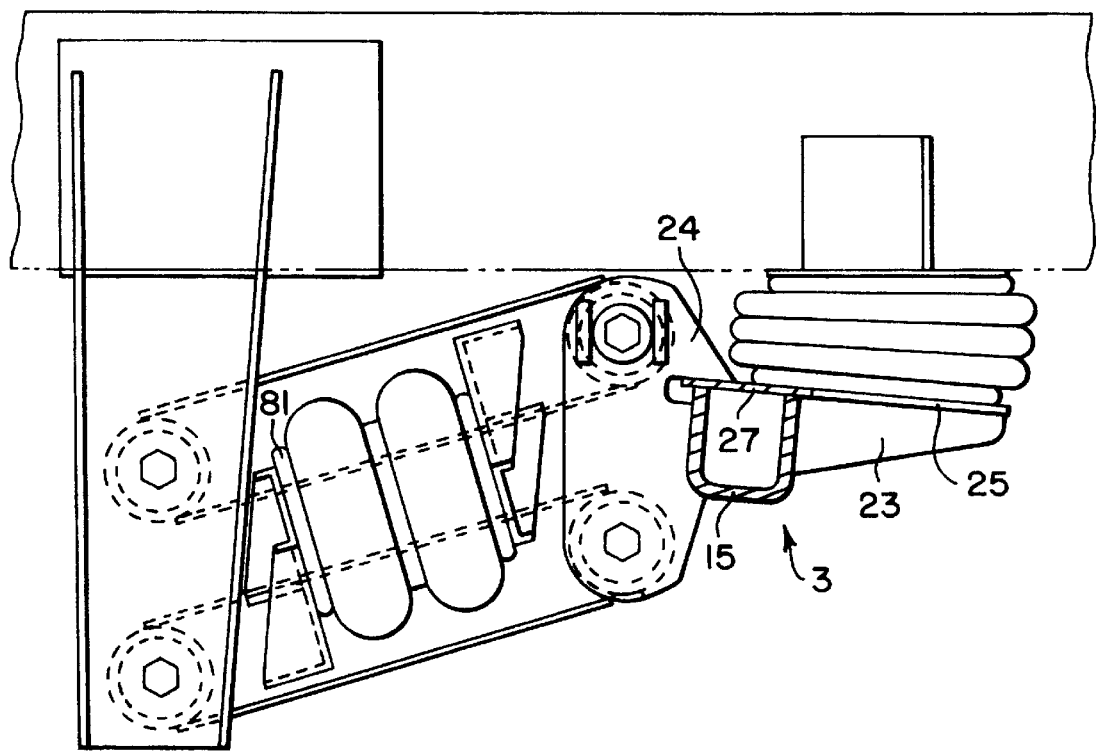
FIG. 20 is a side plan, partially sectionalized, view of the fabricated steer axle of FIGS. 1–19, as used in conjunction with a lift axle suspension system for a wheeled vehicle.

FIG. 20 is a side view, partially sectionalized, of the fabricated steer axle assembly 1 of FIGS. 1–19 being used in conjunction with, and attached to, a wheel bearing lift axle suspension system for a wheeled vehicle (e.g. truck or trailer). The illustrated suspension system may include at least two non-liftable wheel bearing suspensions providing the primary means of support for road engagement of the vehicle, and the illustrated lift axle suspension system includes a frame bracket, upper and lower control arms having first ends pivotally attached to the frame bracket at pivot points and second ends attached to an axle connection means. The lift axle suspension also includes a system for raising and lowering the wheels of the suspension into and out of engagement with the road surface. An exemplary such suspension may be found in U.S. Pat. No. 5,403,031, the disclosure of which is hereby incorporated herein by reference.

It is pointed out that steel axle 3 may also be utilized as a front steer axle, or as any other steer axle on a car, trailer, or truck. In other embodiments, the axle 3 may be flipped over from its FIG. 1 position and/or reinforcing plate 41 and a corresponding guide hole may be located on the bottom or lower side of the axle.

Described below is an exemplary method of manufacturing axle assembly 1. The first step is the forming or stamping of the integral one piece metallic (e.g. micro-alloyed steel) form 11 shown in FIG. 17. At this initial stage, form 11 defines a single plane and is substantially X-shaped. Thereafter, sidewalls 12 and 13 (and arms 16–19) of form 11 are each bent upward approximately 90° about bend lines 51 which results in the form 11 shown in FIGS. 18–19, that includes substantially U-shaped central portion 21, and spaced arms 16–17 extending from one end thereof and spaced arms 18–19 extending from the other end thereof.

After form 11 of FIGS. 18–19 has been bent, metallic (e.g. micro-alloyed steel) cover plate 27, including guide holes 28 machined therein (see FIGS. 8–9), is welded across so as to abridge open portion 53 of U-shaped member 21 in a manner such that plate 27 extends across the entire length of form 11 connecting sidewalls 12 and 13 from one king pin mounting area to the other. The welding of plate 27 to the U-shaped member begins at point 60 (see FIG. 1), and the weld travel direction for each side of plate 27 is directed toward the respective ends of the axle. Thus, for each side of plate 27, one weld begun at point 60 travels toward one end of the axle while another begun at the same point 60 travels toward the other axle end.

Thereafter, metallic (e.g. micro-alloyed steel) king pin mounting plates 29 and 30, with orifices 31 machined therein (see FIGS. 15–16), are welded to form 11 so as to connect the lower edges of the arms (16–19) along the bottom of the axle opposite plate 27. The respective welds attaching each plate 29, 39 to U-shaped form 11 travel from the end of axle toward its center. In certain embodiments, welds are provided along the entire outer edges of plates 27, 29, and 30 so as to affix these plates to form 11 at the edges of sidewalls 12 and 13.

Following the attachment of plates 27, 29, and 30 to form 11, a floating metallic (e.g. micro-alloyed steel) reinforcing plate 41, with orifice 43 machined therein (see FIGS. 7–8), is inserted into the cavity defined between sidewalls 12 and 13 at each king pin mounting structure 5. After king pin receiving orifices 31 and 43 are aligned in a linear manner for receiving the king pin 7, plate 41 is welded to the axle so that the upper planar surface of plate 41 abuts the lower planar surface of plate 27. In each king pin mounting area, all three plates 27, 29(30), and 41 are substantially parallel to one another. As shown in FIG. 8, when orifices 31 and 43 are aligned for receiving the king pin, orifice 43 is not necessarily concentric with guide hole 28, as hole 28 has a substantially larger diameter than that of orifices 31 and 43.

After reinforcing plate 41 has been affixed to the axle, optionally, an end plate 45 may be welded to each end of axle 3 so as to enclose the cavity defined by the tubular fabricated axle.

Following the manufacture of axle of 3, a king pin 7 is pressed through orifices 43 and 31 at each king pin mounting structure 5, with the end result being that each king pin 7 extends through orifice 28 in a non-bearing manner, and orifices 43 and 31 in a tight bearing manner. Orifices 43 and 31 rigidly retain king pin 7 against lateral and/or tilting movement during vehicle operation in a non-rotatable manner. Suspension mounting members 24 and spring supports 23 may be welded to form 11 at any point during the fabrication procedure. Upon completion and in use, as shown in FIGS. 1–2, sidewalls 12 and 13 are substantially vertically oriented, while plates 27, 29, and 30 are oriented so as to extend substantially horizontally.

It has been found that the above recited fabrication process is easily adapted to a wide variety of configurations with minimal tooling costs. It is also believed that, using state of the art robotic welding, the cost of fabrication will be substantially less than that of I-beam axle forging.

According to a typical design of axle assembly 1, the axle 3, shown in FIG. 1, may be about 75 inches in length from end to end, have a dimension "x" of about 3.25 inches (see FIGS. 3–4), a dimension "$y_1$", of about 5.0 inches (see FIG. 3), a dimension "$Y_2$" of about 7.20 inches (see FIG. 4), and define a distance of about 30.75 inches between the respective centers of air spring mounts 23.

FIGS. 21–28 illustrate fabricated axle assembly 1 according to another embodiment of this invention. Axle 3 of this embodiment is different than that of the previous embodiment (FIGS. 1–20), in that a pair of combined air spring and suspension mounting members 91 are provided on the axle. Unlike the FIG. 1–20 embodiment, the axle assembly embodiment of FIGS. 21–28 includes members 91, each of which represents a suspension attachment and air spring mount integrally formed with one another. Furthermore, in the FIG. 21–28 embodiment, top plate 27 is angled upward in areas 92 where mounts (or axle seats) 91 are attached to axle 3. Each of the two axle seat mounting areas 92 of axle 3 along the top of the axle 3 are angled upward relative to the horizontal from about 5 to 50 degrees, preferably about 20 degrees.

Figure 21:
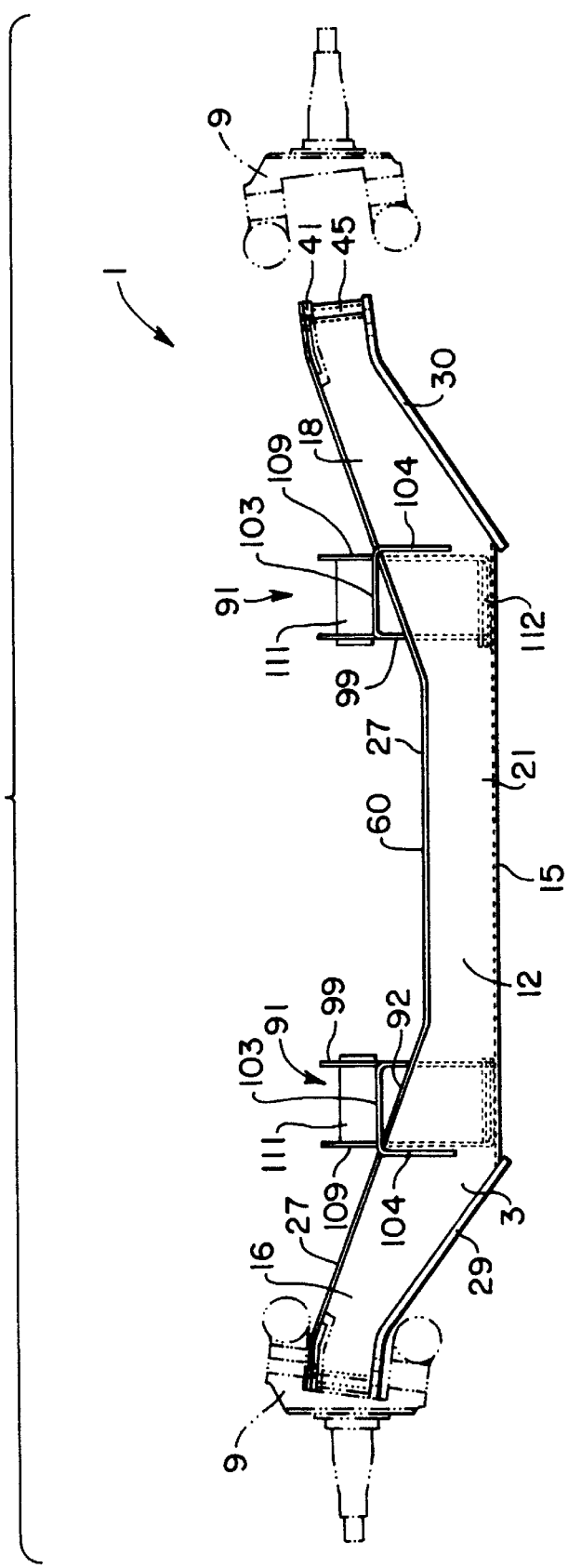
FIG. 21 is a front elevational view of a steer axle assembly according to another embodiment of this invention.
Figure 22:
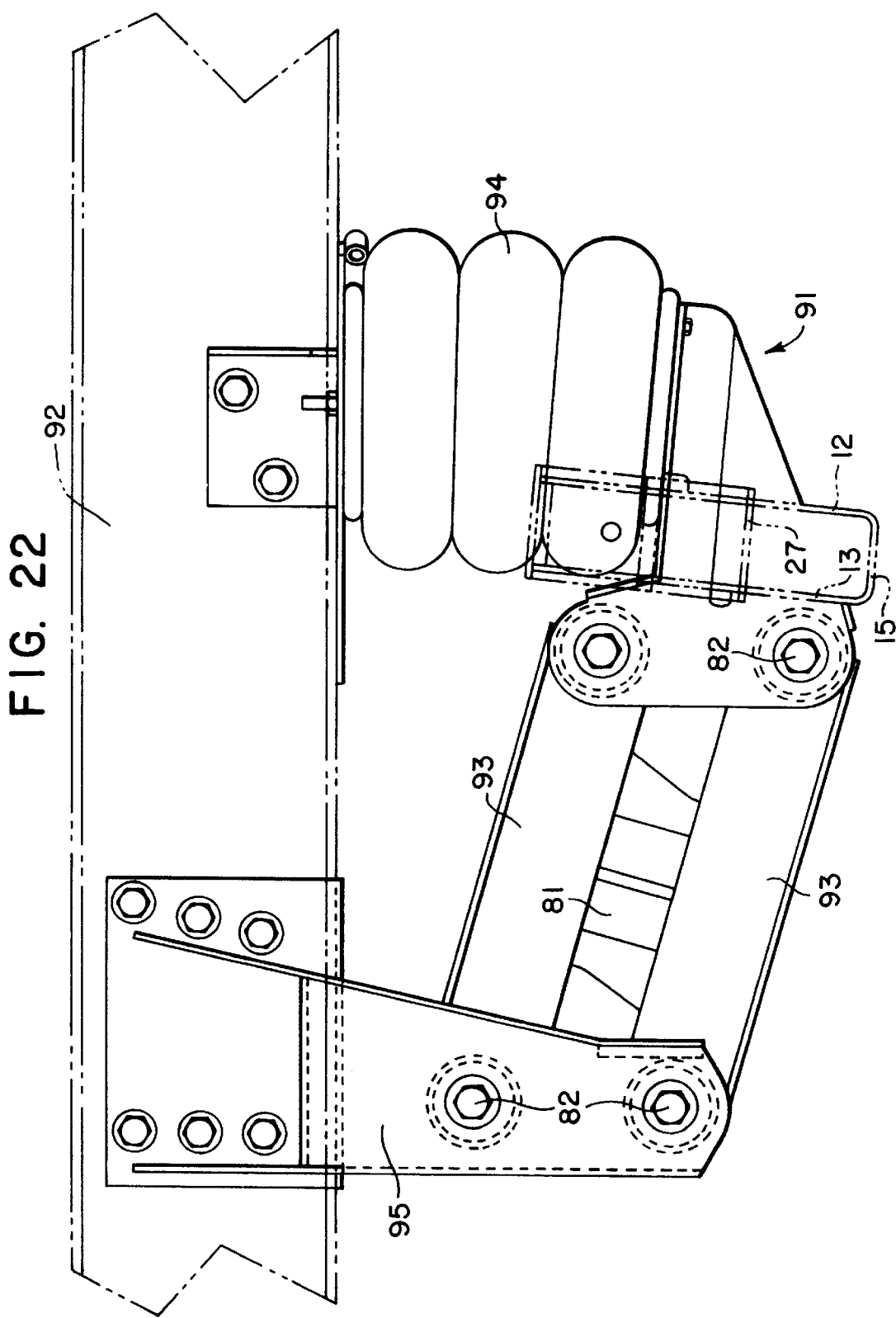
FIG. 22 is a side plan, partially sectionalized, view of the FIG. 21 fabricated steer axle assembly, as used in conjunction with a lift axle suspension system for a wheeled vehicle.

FIG. 22 illustrates the axle assembly of FIG. 21, being used in conjunction with a lift axle suspension system attached to vehicle frame 92, the suspension including substantially parallel pivoting arms 93, air spring 94, air bellows 81, pivot points 82, and hanging bracket 95. See U.S. Pat. No. 5,403,031, for more detail regarding the illustrated lift axle suspension.

Figure 23:
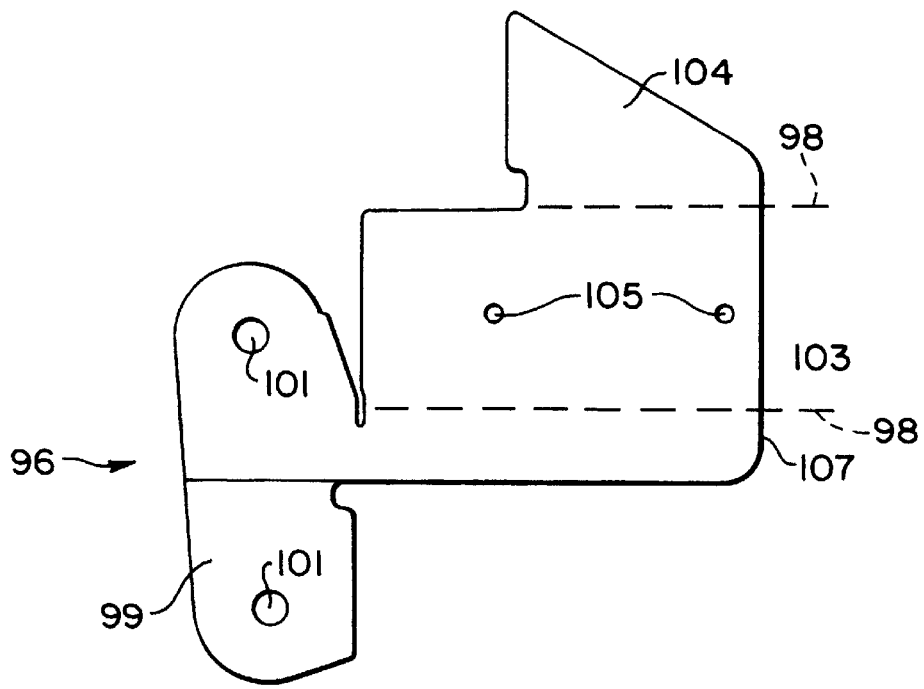
FIG. 23 is a top plan view illustrating a first section of the combined air spring mount/suspension mount of the FIG. 21 embodiment, prior to bending and forming.
Figure 24:
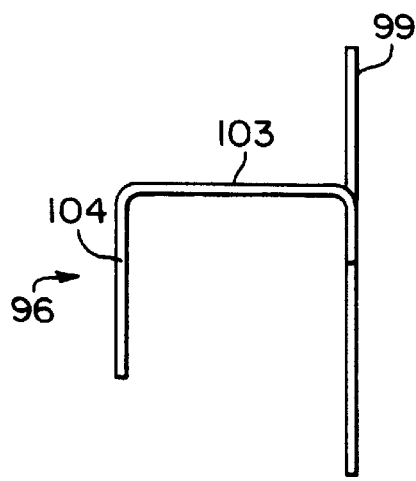
FIG. 24 is a front plan view illustrating the FIG. 23 form, after bending about the illustrated bend lines.
Figure 25:
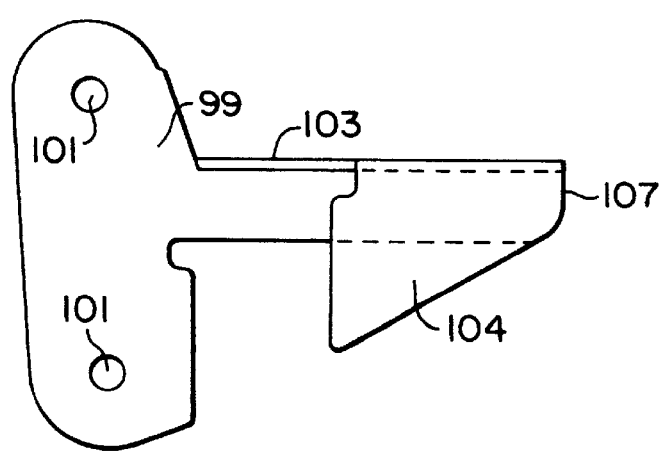
FIG. 25 is a side plan view of the FIG. 23–24 air spring/suspension mount after forming.

Each axle seat member 91 is made up of a first section 96 and a second section 97 that are welded together. FIGS. 23–25 illustrate first section 96, while FIGS. 26–28 illustrate second section 97. FIG. 23 illustrates axle seat section or portion 96 in its stamped or planar form, prior to bending about bend lines 98. Portion 96 is then bent at right angles about bend lines 98, resulting in the formed or shaped portion 96 illustrated in FIGS. 24–25. As illustrated, shaped portion 96 includes planar ear 99 that includes apertures 101 defined therein which allow the axle assembly to be attached to the suspension. From substantially vertically aligned ear 99, cross-connecting air spring mounting section 103 extends substantially horizontally and is integrally formed with vertically aligned section 104. Apertures 105 are provided in air spring mounting section 103 so as to allow the air springs to be mounted to the axle assembly. According to certain preferred embodiments, the distance between apertures 105 may be approximately 6.20 inches, the vertical distance between apertures 101 approximately 7.47 inches, the length of member 103 from 99 to 104 (see FIG. 24) approximately 5.87 inches, and the horizontal distance (see FIG. 23) from the lower aperture 101 to the end 107 of portion 96 approximately 13.03 inches.

FIGS. 26–27 illustrate second portion 97 of axle seat member 91, before it is welded to portion 96. FIGS. 26 and 27 illustrates portion 97 in planar form after stamping, but prior to bending or forming, while FIG. 28 illustrates portion 97 after bending/forming. Axle seat portion 97 includes vertically aligned ear 109 (opposing ear 99) that includes suspension mounting apertures 110 defined therein. Connected to ear 109 are cross-connecting member 111 to be connected to portion 96 for providing axle seat member 91 with stability, and horizontally aligned member 112. Together, members 111 and 112 distribute the load more equally onto the axle beam. According to an exemplary embodiment, the width "w" of member 112 may be about 1.51 inches, while distance "z" of member 111 may be about 2.51 inches, and length "l" of member 111 from bend line 121 to the end of member 111 may be about 5.87 inches. The horizontal distance between apertures 110 may about 7.24 inches according to certain embodiments.

As shown in FIG. 21, a first portion 96 and a second portion 97 are welded, or otherwise connected, together so as to form each axle seat 91, each seat 91 including the air spring mount and the suspension mount integrated into a single unit. Each member 91 is then welded to the axle beam at areas 92 for suspension connection. The interconnection of these parts allows for improved load distribution onto the axle beam, as well as ease of manufacture. With regard to the embodiment shown in FIGS. 21–28, the angled transition areas 92 of plate 27 are more cost effective to manufacture, and produce fewer stress risers.

Once given the above disclosure many other features, modifications and improvements will become apparent to the skilled artisan. Such other features, modifications and improvements are therefore considered to be a part of this invention, the scope of which is to be determined by the following claims.

We claim:

1. An axle for a wheeled vehicle, the axle comprising:

an integral one piece metallic form including a substantially U-shaped central portion and a pair of spaced arms each having a first end extending from each end of said U-shaped central portion and each arm having a second end opposite said first end, said second ends of each pair of said arms defining therebetween a king pin mounting area, and said U-shaped central portion having an open portion and a closed portion;

a first plate member located over and abridging said open portion of said U-shaped central portion; and a second plate member located under and abridging said spaced arms extending from each end of said U-shaped central portion.

2. The axle of claim 1, further comprising first and second king pin mounting plates, said first king pin mounting plate connecting one pair of said arms opposite said plate member, and said second king pin mounting plate connecting the other pair of said arms opposite said plate member, and wherein each of said king pin mounting plates includes an orifice defined therein for receiving a king pin in a bearing manner.

3. The axle of claim 2, further including first and second air spring mounting members affixed to said U-shaped central portion.

4. The axle of claim 1, wherein each pair of said spaced arms extends at an angle from said form so as to define ends for receiving king pins.

5. The axle of claim 1, further including first and second axle seat members, each axle seat member including a suspension mounting portion and an air spring mounting portion.

6. The axle of claim 5, wherein each of said axle seat members includes a first portion and a second portion connected to one another, each of said first portion and said second portion including an ear member including a pair of suspension mounting apertures defined therein.

7. The axle of claim 1, further comprising first and second air spring mounting members attached to said axle, each of said first and second air spring mounting members affixed to said axle along a portion thereof that is angled upward relative to the horizontal from about 5–50 degrees.

8. An axle for a wheeled vehicle, the axle comprising:

an integral one piece metallic form including a substantially U-shaped central portion and a pair of spaced arms extending from each end of said U-shaped central portion, said U-shaped central portion having an open portion and a closed portion;

a plate member located over and abridging said open portion of said U-shaped central portion; and a floating reinforcing plate extending between each pair of said spaced arms and located in said respective king pin mounting areas, each of said floating reinforcing plates having an orifice defined therein for retaining a king pin and being of sufficient strength to provide a bearing for a king pin.

9. The axle of claim 8, wherein said axle is a non-driven steer axle.

10. The axle of claim 9, wherein said plate member is elongated and, in addition to connecting said open portion of said U-shaped central portion, extends along and connects each pair of said spaced arms, and said plate member having a guide hole defined therein at each end thereof for receiving the king pin in a non-bearing manner.

11. The axle of claim 8 which further includes a king pin located in said orifice and in bearing engagement with said floating reinforcing plate.

12. The axle of claim 11 wherein said closed portion of said U-shaped central portion is in tension during operation of the wheeled vehicle.

13. An axle assembly for a wheeled vehicle, the axle assembly comprising:

first and second opposing sidewalls each extending to a king pin mounting structure and defining a cavity therebetween;

a king pin mounting plate having a king pin receiving orifice defined therein, said king pin mounting plate abridging said first and second sidewalls at one side thereof, and said receiving orifice being of a size so as to receive the king pin in a bearing manner in order to support the king pin against lateral movement;

a cover plate having a guide hole defined therein through which the king pin is adapted to be fed, said cover plate abridging said first and second sidewalls at the other side thereof opposite said king pin mounting plate; and a reinforcing plate having a king pin receiving orifice defined therein for receiving the king pin in a bearing manner so as to support the king pin against lateral movement, said reinforcing plate inserted and located in said cavity between said first and second sidewalls adjacent said cover plate.

14. The axle assembly of claim 13, wherein said reinforcing plate is disposed between said cover plate and said king pin mounting plate, said reinforcing plate being located closer to said cover plate than said king pin mounting plate.

15. An axle assembly for a wheeled vehicle, the axle assembly comprising:

an elongated tubular axle including a king pin mounting structure at an end thereof for receiving a corresponding vehicle king pin;

said king pin mounting structure including a top plate and a bottom plate, each attached to sidewalls of said axle, said top and bottom plates defining a hollow cavity therebetween in conjunction with said sidewalls; and wherein said king pin mounting structure further includes a king pin reinforcing means for receiving the king pin via an orifice defined therein, said king pin reinforcing means being disposed between said top plate and said bottom plate so that the king pin extends through each of said orifice and openings defined in said top and bottom plates.

16. The axle assembly of claim 15, wherein said king pin reinforcing means includes a plate member having said orifice defined therein, said plate member being mounted immediately adjacent one of said top and bottom plates.

17. The axle assembly of claim 16, wherein said plate member is located immediately adjacent said top plate, and said orifice in said plate member and said opening in said bottom plate provide the primary bearing surfaces for the king pin during operation of the vehicle.

18. The axle assembly of claim 15, wherein said axle includes an integrally formed one piece substantially U-shaped portion located between a pair of said king pin mounting means, one of said king pin mounting structures located at each end of said elongated axle.

19. The axle assembly of claim 18, wherein said top plate covers the open end of said U-shaped portion at a location between said pair of king pin mounting structures.

20. The axle assembly of claim 18, wherein said integrally formed one piece U-shaped portion further includes a pair of spaced arms extending from each end thereof toward a respective one of said king pin mounting structures.

21. An axle for a wheeled vehicle, the axle comprising:

an elongated portion extending between first and second king pin mounting means;

at least one of said king pin mounting means for receiving a king pin including first, second, and third substantially parallel plates having defined therein first, second, and third orifices, respectively, for receiving the king pin.

22. The axle of claim 21, wherein said first and second orifices are smaller in diameter than said third orifice, and wherein said first and second orifices act as bearing surfaces for supporting the king pin.

23. The axle of claim 22, wherein said first plate is vertically spaced from said second and third plates so as to define a cavity therebetween.

24. The axle of claim 23, wherein said first, second, and third plates are parallel to one another.

25. The axle of claim 24, wherein said second and third plates abut one another.

26. In an axle suspension system for a wheeled vehicle comprising an axle, a king pin assembly and structure for mounting said king pin assembly to said axle, characterized by said structure for mounting said king pin assembly to said axle including a plate connecting the king pin assembly to the axle, said plate being located proximal an end of said king pin assembly and connected to said king pin assembly in such a manner that bearing forces are transferred from said king pin assembly to said plate and wherein the said connection between said plate and king pin assembly is free of any weld at a location where said weld would be placed in tension.

27. In an axle suspension system according to claim 26 further characterized by said axle comprising an integral one piece metallic form including a substantially U-shaped central portion and a pair of spaced arms extending from each end of said U-shaped central portion, said U-shaped central portion having an open portion and a closed portion; and an axle plate located over and abridging said open portion of said U-shaped central portion so that said closed portion of said U-shaped central portion is in tension during operation of the wheeled vehicle.

28. In an axle suspension system according to claim 27 wherein said spaced arms comprise end portions which form a part of said structure for mounting said king pin assembly to said axle.

29. In an axle suspension system according to claim 28 wherein said structure for mounting said king pin assembly to said axle further includes a floating reinforcing plate extending between each pair of said spaced arms, said floating reinforcing plate having an orifice defined therein for retaining a king pin and being of sufficient strength to provide a bearing for the king pin.

30. In an axle suspension system according to claim 26 wherein said axle suspension system is a non-driven steer axle suspension system.

31. In an axle suspension system for a wheeled vehicle including an axle system for connecting wheels thereto through a king pin assembly mechanism and wherein said axle system includes a central substantially horizontal section and an upwardly extending portion of said axle system at either end of said central section for connecting a king pin assembly to said axle system, characterized by said upwardly extending sections at each end of said axle system including a pair of side plates, each having top and bottom edges, a top plate, and a bottom plate, said top and bottom plates abridging said side plates at their top and bottom edges respectively, and such that the ends of said plates so constructed define a mechanism for connecting said king pin assembly thereto, and being further characterized by welds attaching said side plates at their bottom edges to said bottom plates and the axle being so constructed that said welds are not placed in tension during operation of the vehicle.

32. In an axle suspension system according to claim 31 wherein said axle suspension system is a non-driven steer axle suspension system.

33. The axle suspension system according to claim 31 wherein said suspension system is a lift axle suspension system and further includes wheels and means for raising the wheels out of and lowering said wheels into engagement with a road surface during operation of said vehicle.

34. In a lift axle suspension system for a wheeled vehicle including an axle, a frame bracket, an axle connection member, upper and lower control arms having first ends pivotally attached to said frame bracket and second ends attached to said axle connection member, and a system for raising and lowering wheels of the suspension into and out of engagement with the road surface; the improvement comprising as said axle, an axle according to claim 8.

* * * * *

UNITED STATES PATENT AND TRADEMARK OFFICE
CERTIFICATE OF CORRECTION

PATENT NO. : 5,810,377
DATED : Sep. 22, 1998
INVENTOR(S) : Michael J. Keeler and Michael J. Gottschalk It is certified that error appears in the above-identified patent and that said Letters Patent is hereby corrected as shown below:

Column 10, Claim 8, line 33, cancel "said". (2nd occurrence)

Signed and Sealed this

Second Day of March, 1999

Attest:

Q. TODD DICKINSON

Attesting Officer

Acting Commissioner of Patents and Trademarks